United States Patent
Saikkonen et al.

(10) Patent No.: US 7,421,330 B2
(45) Date of Patent: Sep. 2, 2008

(54) ADAPTIVE LOAD BALANCING SYSTEM

(75) Inventors: Ari Saikkonen, Vaasa (FI); Kaj Portin, Vaasa (FI)

(73) Assignee: Wartsila Finland Oy, Vaasa (FI)

( * ) Notice: Subject to any disclaimer, the term of this patent is extended or adjusted under 35 U.S.C. 154(b) by 124 days.

(21) Appl. No.: 10/598,922

(22) PCT Filed: Mar. 15, 2005

(86) PCT No.: PCT/FI2005/050081

§ 371 (c)(1), (2), (4) Date: Sep. 14, 2006

(87) PCT Pub. No.: WO2005/088107

PCT Pub. Date: Sep. 22, 2005

(65) Prior Publication Data

US 2007/0150165 A1 Jun. 28, 2007

(30) Foreign Application Priority Data

Mar. 15, 2004 (FI) .................................. 20045075

(51) Int. Cl.
*F02D 41/00* (2006.01)
*G06F 19/00* (2006.01)

(52) U.S. Cl. ..................... 701/104; 701/111; 123/480

(58) Field of Classification Search ......... 701/103–105, 701/111, 115, 102; 123/480, 436, 406.21
See application file for complete search history.

(56) References Cited

U.S. PATENT DOCUMENTS

| | | | |
|---|---|---|---|
| 4,002,151 A * | 1/1977 | Toyoda et al. | 123/3 |
| 4,117,814 A * | 10/1978 | Takahashi | 123/568.19 |
| 4,936,277 A | 6/1990 | Deutsch et al. | |
| 5,215,059 A * | 6/1993 | Kaneyasu | 123/406.27 |
| 6,000,384 A | 12/1999 | Brown et al. | |
| 6,988,484 B1 * | 1/2006 | Kujawa et al. | 123/406.3 |
| 2003/0183203 A1 | 10/2003 | Unland et al. | |

FOREIGN PATENT DOCUMENTS

EP 0529786 3/1993

* cited by examiner

*Primary Examiner*—Hieu T Vo
(74) *Attorney, Agent, or Firm*—Smith-Hill and Bedell

(57) ABSTRACT

An an internal combustion engine has a plurality of cylinders for providing the necessary energy used for the work performed by the engine. Cylinder specific knock monitoring is used in order to distribute the load automatically among the cylinders of the engine. When an individual cylinder knocks continuously, the antiknock control system of the cylinder aims at reducing permanently the quantity of fuel supplied to the cylinder. The fall in the total output caused by the reduction of fuel supply is compensated by increasing the fuel supply to all cylinders. The new operating values of the engine provided by the adjustment are stored in the memory and used also as new reference values.

20 Claims, 3 Drawing Sheets

ADAPTIVE LOAD BALANCING SYSTEM

This is a national stage application filed under 35 USC 371 based on International Application No. PCT/FI2005/050081 filed Mar. 15, 2005, and claims priority under 35 USC 119 of Finnish Patent Application No. 20045075 filed Mar. 15, 2004.

FIELD OF INVENTION

The invention relates to an internal combustion engine, which is equipped with a plurality of cylinders for providing the necessary energy for the work performed by the engine. In particular, the invention relates to control systems for an internal combustion engine.

PRIOR ART

Internal combustion engines, except for smaller engine designs, are provided with a plurality of cylinders, in which the energy released from the combustion reactions of the fuel are converted into a mechanical form. The energy converted into a mechanical form is utilised for the work performed by the internal combustion engine, for instance for rotating a ship propeller. The work performed/to be performed is also called a load. Accordingly, each cylinder, by its production of mechanical energy, has charge of one part the engine load. The total yield of the cylinder and the engine is generally expressed as an output.

It is known from prior art that the engine load is distributed equally among the cylinders. If the engine has e.g. eight cylinders, each cylinder handles an eighth part of the total load. In practise, the load distribution among the cylinders is not, however, completely equal, as there are differences between the cylinders. The differences are due to manufacturing tolerances and some disparities that appear during the mounting process. Thus, the cylinders differ from one another for instance with respect to temperatures as well as fuel and air flows. During the test runs of the engine these differences are taken into account when manually adjusting the operating settings for each cylinder. The engine wear caused by the operation thereof may change the situation of the load distribution among the cylinders, whereby the manual adjusting of the operating settings for the cylinder needs to be repeated, as required. By the load distribution the engine is made to operate within the most optimum operating range.

The engine load does not necessarily remain constant during the entire operating time. A ship is for instance steered more slowly in the harbour area than in the open sea. Therefore, the engine has various control circuits, the purpose of which is to make the engine operate in a desired mode. For instance, when the engine load changes, the quantity of fuel supplied to each cylinder is adapted accordingly. In order to make the engine work in a desired mode, considering for instance the load on the environment, the temperature of the exhaust gas is measured, on the basis of which measurement the duration of cylinder specific injection is adjusted for lower engine outputs. The aim is to avoid cylinder knock (a characteristic feature especially in Otto-cycle engines) and misfires. In other words, by the cooperation of various control cycles the intention is to keep the engine in as optimum operating mode as possible taking the boundary conditions into account. Due to the boundary conditions, such as the load distribution among the cylinders, the engine does not necessarily work within the best possible operating range.

As discussed hereinbefore, one problem related to prior art is the fact that the load distribution among the cylinders needs to be carried out manually. Especially when the engine knocks, the load distribution is a problem. The existing load balancing makes a boundary condition for the control circuits of the engine, whereby they are not capable of eliminating this problem. Manual load balancing requires a visit of a serviceman and therefore the engine must, until the maintenance visit, operate with the existing load balancing values, which is an extra stress on the engine.

A purpose of the present invention is to eliminate the problem discussed in the foregoing. The purpose is achieved as is described in the claims.

BRIEF DESCRIPTION OF THE INVENTION

The idea of the invention is to use cylinder specific knock monitoring in order to distribute the load automatically among the cylinders of the engine. The global (common fuel supply to all cylinders) duration of the injection is, according to prior art, adjusted by means of a speed/power controller of the engine. The speed/power controller provides the basic control of the global quantity of fuel supplied to the cylinders. In addition to the basic quantity of fuel, which changes due to the speed/power control, the quantity of fuel entering the cylinder is also affected by the cylinder specific adjustment coefficient. According to the invention the cylinder specific adjustment coefficient is self-adaptive at the initial start-up of the engine. By this co-efficient the differences between the cylinders are taken into account.

When an individual cylinder starts knocking continuously, the antiknock control system of the cylinder aims at reducing temporarily the amount of fuel entering the cylinder. The performed reduction of fuel supply at the same time lowers the output of the cylinder, which consequently, lowers the total power output of the engine. This reduction of the total output power is compensated by the increase of fuel supply to the all cylinders, whereby said cylinders provide a higher total output. This adjustment is performed by the speed/power controller of the engine. The reduced fuel supply to the knocking cylinder (shortened duration of fuel injection) is gradually restored to its original value. In the case of continuous knock, the cylinder specific adjustment co-efficient for the knocking cylinder needs to be changed permanently in order to make an effort to eliminate the continuous knock.

This means that the adjustment coefficient changed by the knock control system is set as a new permanent adjustment coefficient for the cylinder. After the fuel supply to the cylinder (duration of fuel injection) has been reduced temporarily within a pre-determined time interval (time window) sufficiently many times, the setting is made permanent. The new operating values of the engine provided by the adjustment, i.e. the cylinder specific adjustment coefficients, are stored in the memory and used also as new reference values, i.e. set values. Thus, the engine has adapted itself to the new conditions.

LIST OF DRAWINGS

In the following the invention is described with reference to the attached drawings, in which FIG. 1 shows an example of a knock margin used for knock prevention;

DESCRIPTION OF THE INVENTION

In order to better clarify the operation of the invention it is advisable to describe a cylinder specific antiknock control, known per se, in more detail. By the antiknock control the aim is to eliminate knock occurrence, i.e. a premature ignition of fuel, in the cylinder. The examples given in this text refer to an internal combustion engine operating either with gas or with fuel oil, but the invention may also be used in other types of Otto-cycle engines.

Figure 1:
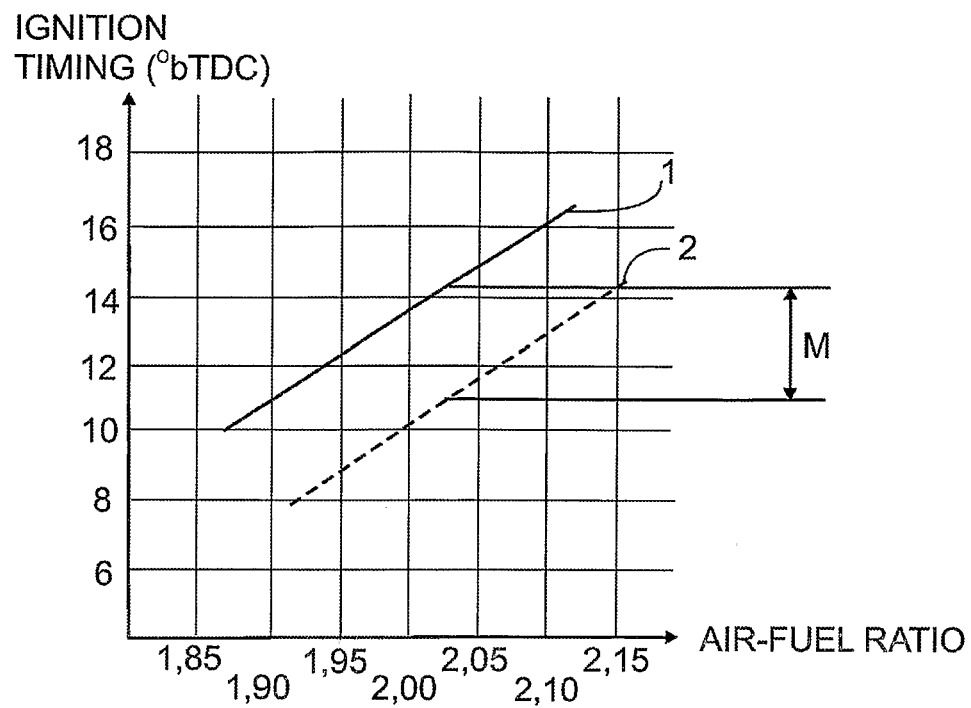

FIG. 1 shows an example of a diagram, where the operating range of the cylinder is shown as variables of air-fuel-ratio and ignition timing. The fuel in this case is gas. The knocking area is located above the solid line 1. The solid line 1 is a called a knock limit. The broken line 2 shows the operating values of the cylinder. The difference in ignition timing with a certain air-fuel-ratio between the knock limit 1 and the broken line is called a knock margin M. The purpose of the knock margin is to prevent knock occurrence in the cylinder. There may be a plurality of knock limits, usually two, whereby the purpose of the first limit is to prevent the cylinder from knocking lightly and the other limit is for preventing a heavy knock in the cylinder.

If the cylinder for some reason starts knocking, the fuel flow to the cylinder, i.e. the quantity of fuel supplied to the cylinder, is reduced, whereby the air-fuel-ratio is increased. Accordingly, the operating point of the cylinder moves to the right in FIG. 1, i.e. away from the knock limit. At the same time the knock margin is increased. When the cylinder stops knocking, it is possible to return to normal air-fuel-ratio, i.e. back to the broken line 2.

Figure 2:
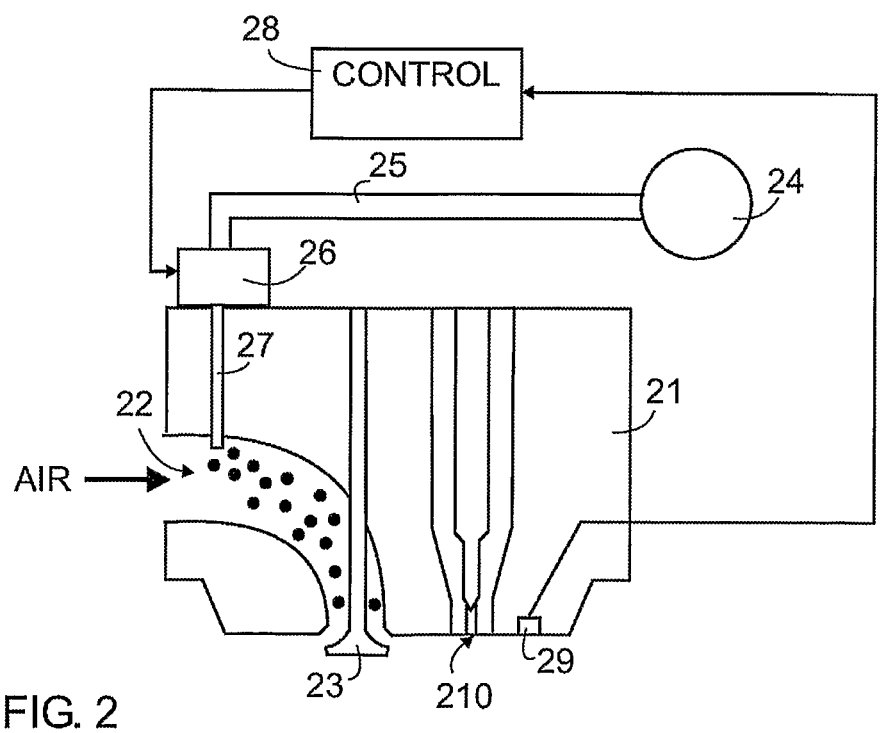
FIG. 2 shows a simple example of a cylinder cover and cylinder specific antiknock control system.

FIG. 2 shows a simplified example of a known cylinder cover 21. The air coming to the cylinder flows through an air duct 22. Also the fuel to the duct is injected through a fuel channel 27. The fuel is conducted from a gas tank 24 along a pipeline 25 to a gas inlet valve 26, which allows the gas to flow into the fuel channel 27. The air-fuel-mixture is allowed to enter the cylinder chamber via a valve 23 being in its open-position. The figure also shows a cylinder specific control circuit, by which the fuel supply to the cylinder is regulated and thus also e.g. knock occurrence in the cylinder prevented. In the cylinder chamber for instance pressure or vibration is measured by means of a sensor 29 suitable for the purpose (a pressure sensor or an acceleration sensor for detecting vibration). The measuring data is transferred to a control member 28 of the control circuit, which provides and transmits a command to the gas inlet valve 26 of the cylinder on the basis of the measuring data. Based on the command the gas inlet valve allows a desired quantity of gas to flow through the fuel channel 27 into the air duct. In addition, FIG. 2 illustrates injection members 210 for fuel oil.

Figure 3:
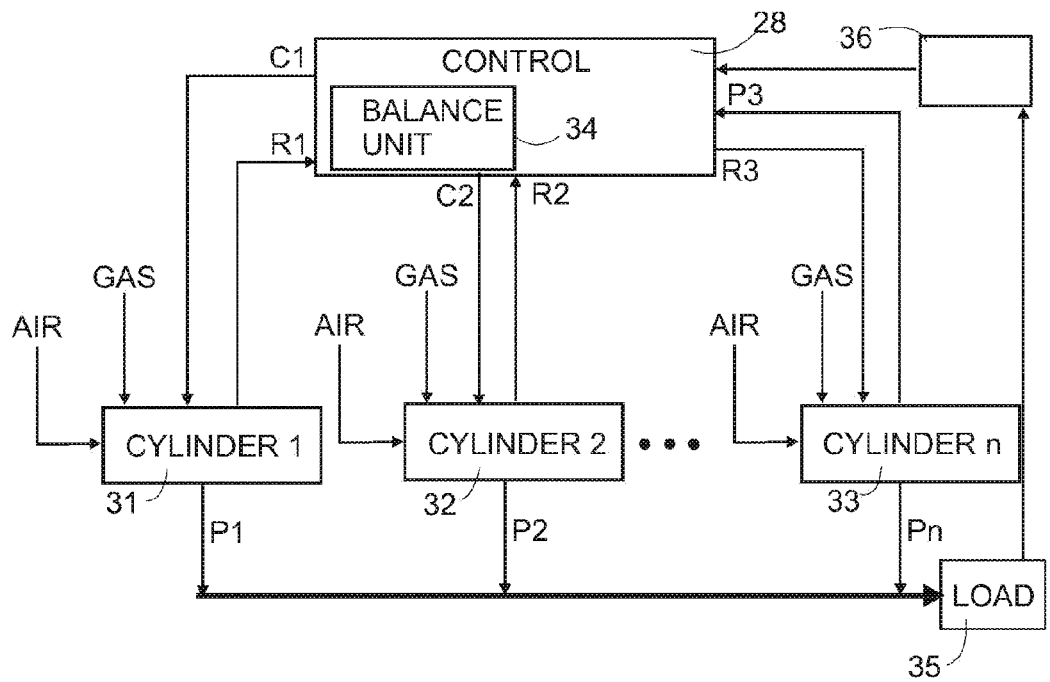
FIG. 3 shows a simple example of a control circuit for engine according to the invention.

FIG. 3 shows a simple example of a control circuit for engine according to the invention. Each cylinder 31, 32, 33 of the engine comprises cylinder specific control (including antiknock control), which is shown in FIG. 2. In this embodiment of the invention the cylinder specific control operates so that in the case of light knock in the engine the aim is to avoid the knock getting worse, i.e. to avoid heavy knock. The quantity of fuel entering the cylinder is decreased by 1% of the normal fuel supply every fifth second until the knock ceases. Then, the air-fuel-mixture-ratio will increase and the operating point of the cylinder moves away from the knocking area, if the situation is reviewed on the basis of the diagram in FIG. 1. Maximum offset is 4% of the fuel supply in a normal situation, which may thus be reached within 20 seconds from the start of the knock. After the knock has stopped the aim is to adapt the cylinder back to the normal fuel supply by adding the quantity of fuel by 1% every seventh second. Thus, if the engine works with a fuel supply of −4%, it may at best return to the normal state in 28 seconds. The control of the normal state of the control circuit is called a reference value control. If the cylinder knocks heavily in an engine, which can use two different fuels, then it is advisable to use fuel oil instead of gas.

As mentioned in the foregoing, the cylinder specific antiknock control according to prior art makes at the same time also the load distribution among the cylinders unequal, whereby the engine works within a disadvantageous operating range. The engine works at lower operating efficiency and it is exposed to extra stress. The cylinder specific reference values should need to be set manually to match the new operating values in order to make the distribution of engine load correct again. This is a problem especially if one cylinder or a plurality of cylinders knocks continuously.

In the solution according to the invention the continuous knock of the cylinder or cylinders is taken into account, when the engine balances the load among the cylinders automatically to match the new operating values (i.e. the new cylinder specific control values), which are made the new set values of the engine. If a light knock in the cylinder gets worse at least 20 times in half an hour (the knock may also have a tendency to subside in half an hour), the quantity of fuel supplied to the cylinder is reduced permanently. In practise this means for instance that the fuel supply to the cylinder in the normal state is reduced permanently by 1% or by several percents by means of the adjustment coefficient for the cylinder. The new quantity of fuel, or rather the operating values characterising it, are stored in the memory and they replace the existing reference values. Thus from that on, the cylinder is controlled by the new reference values. In this embodiment the maximum offset is −10% of the original fuel supply.

The new reference values of the cylinder affect the load distribution among the cylinders. The engine load 35 (FIG. 3) remains often constant in spite of the knock, whereby the engine needs to keep on providing the same power level. The control circuit 28 receives the basic control of the fuel supply from the speed/power controller 36 of the engine. The speed/power controller 36 may also be integrated with the control circuit 28. If, for instance, one engine cylinder 31 has been given the new reference values, the power P1 produced by it will be decreased. The total output of the cylinders P1+P2+Pn needs, however, to remain constant, whereby the power produced by the other cylinders needs to be increased. A balancing unit 34 included in the control circuit 28 handles the distribution of the engine load among the cylinders with the new operating values.

The balancing unit 34 monitors the cylinder specific knock control. If, for instance, the first cylinder 31 of the engine transmits measuring data R1 indicating continuous light knock, and the cylinder specific control has not been able to eliminate this, then the balancing unit changes the operating values of the cylinder 31 permanently. This change affects the balance between the cylinders by changing the mutual ratio of the cylinder specific adjustment coefficients. In addition, the other cylinders need to compensate for the power loss caused by the knocking cylinder. The problem is solved by increasing the adjustment coefficients for the all cylinders appropriately, whereby both the power loss caused by the knocking cylinder is compensated for and the balance between the cylinders is maintained. In this way the new operating values of the cylinders provided by the balancing unit 43 replace the existing reference values. Eventually, the speed/power controller 36 performs the final regulation of the quantity of fuel supplied to the cylinders. The new reference values are transmitted as controls C1, C2, C3 to the gas inlet valves of the engine cylinders. The cylinders 31, 32, 33 transmit respective measuring data R1, R2, R3 normally to the control circuit.

Figure 4:
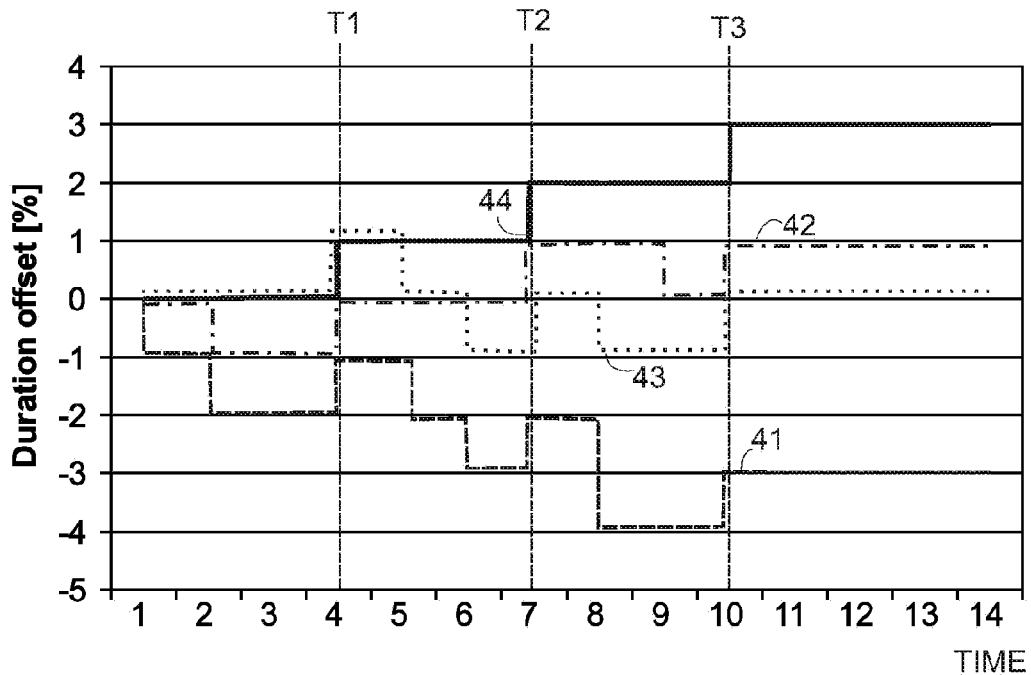
FIG. 4 shows an exemplary diagram illustrating how the load is distributed among the cylinders according to the invention and FIG. 5 shows an exemplary flow diagram illustrating the method according to the invention.

FIG. 4 shows an exemplary diagram illustrating the load distribution among the cylinders, i.e. the balancing of the cylinders, according to the invention. The balancing is based on the use of a balancing vector. The balancing vector includes cylinder specific offset coefficients, i.e. adjustment coefficients, from the normal fuel quantity. Thus, if the cylinder knocks and the fuel supply thereto has been decreased by 1%, the coefficient for the cylinder in the vector is the original coefficient −1. The vector sum has in the manufacture of the engine or at the initial start-up of the engine been set as close to zero as possible. The aim is now to keep this vector sum at zero or close to zero. In practise, the value of the vector sum has been given a certain range. A negative coefficient of a continuously knocking cylinder causes exceeding of this range and at the same time indicates a need to change the cylinder specific adjustment coefficients. It is to be noted that the balancing value of the vector sum may also be another figure than zero. The use of zero is, however, advantageous from calculatory point of view.

In the example of FIG. 4 the engine has four cylinders. The respective graphs 41, 42, 43 and 44 illustrate the adjustment coefficients for the cylinders (and at the same time rate of the cylinder specific fuel quantity of the set value for the fuel quantity established by the speed/power controller). At first, the adjustment coefficients for all cylinders are zeros in this example. During time period 1 the knock control of the first cylinder reduces the adjustment coefficient by −1, which is shown by graph 41. During time period 2 the knock control of the second cylinder reduces the adjustment co-efficient by −1, which is shown by graph 42. The knocking cylinders continue to knock and at moment T1 the coefficients for the continuously knocking cylinders are changed permanently. At the same time the coefficients for the all cylinders are increased permanently by 1 in order to compensate the power loss in the power production of the engine caused by the knocking cylinders. Consequently, the balance between the adjustment coefficients for the cylinders, which now takes also the knocking cylinders into account, is maintained.

During time period 5 the first cylinder and the third cylinder start knocking, which is shown by graphs 41 and 43, respectively, as a reaction of the cylinder specific knock controls. The knock of these cylinders gets worse during time period 6. At moment T2 the coefficients for the continuously knocking first and third cylinder are changed permanently. At the same time the coefficients for the all cylinders are increased permanently by 1 in order to compensate the power loss in the power production of the engine caused by the knocking cylinders. During time period 8 the first cylinder and the third cylinder start knocking again, to which the cylinder specific knock controls react again. During time period 9 the second cylinder starts knocking, to which the knock control reacts. At moment T3 the coefficients for the knocking first and third cylinder are changed permanently and again the coefficients for the all cylinders are increased permanently by 1 in order to compensate the power loss in the power production of the engine caused by the knocking cylinders. After this, there is no longer any knock occurrence in the cylinders and the cylinders are controlled by the last set and stored operating values. FIG. 4 illustrates how the engine adapts itself to the new situation, if one or several cylinders start knocking continuously.

Figure 5:
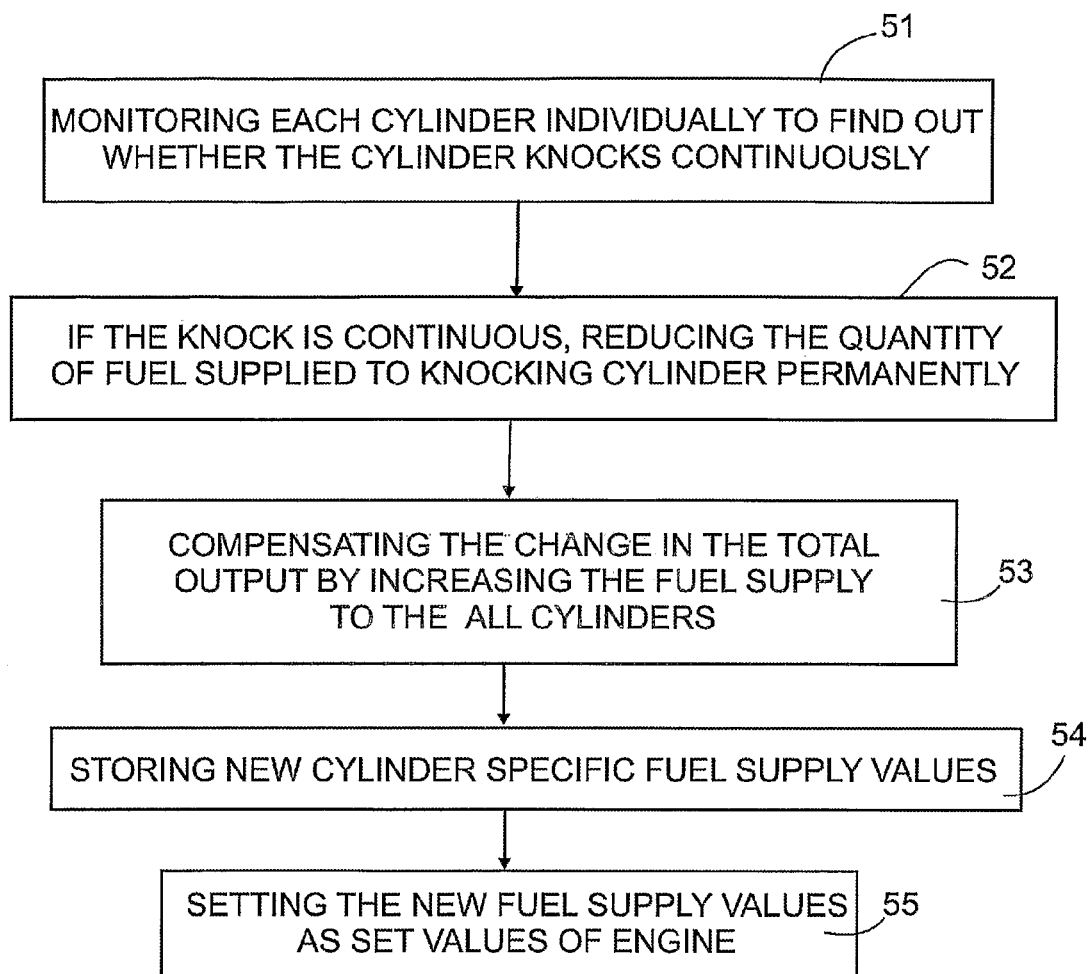

FIG. 5 shows an exemplary flow diagram illustrating the method according to the invention. The flow diagram shows the main characteristics of the method. In the method, each cylinder is monitored individually 51, to find out whether the cylinder knocks continuously, by utilising cylinder specific measuring data provided by the antiknock control system. Fuel supply to a continuously knocking cylinder is reduced permanently 52. The change in the total output of the engine caused by said reduction of fuel supply is compensated 53 by increasing the fuel supply to the all cylinders of the engine. The new cylinder specific fuel supply values are stored 54 and set 55 as cylinder specific set values of the engine. The speed/power control of the engine handles the final regulation of the quantity of fuel supplied to the cylinders of the engine.

Continuous knock is discovered, for instance, when in the cylinder specific monitoring it is counted how many times within a predetermined time period the cylinder specific antiknock control system needs to initiate an adjustment that endures at least one control period in order to reduce the fuel supply to a knocking cylinder.

The control period of the cylinder specific antiknock control system for knock reduction is e.g. 5 seconds. For instance, the fuel supply to the cylinder is reduced by 1% every fifth second in response to the measuring data. When the knock ceases, the antiknock control system aims at increasing the fuel supply by 1% every seventh second in order to reach the reference fuel level applied to the cylinder. The time period, during which the times are counted, is for instance 20-40 minutes. A cylinder is defined as continuously knocking, when a certain number of times is reached in the counting. The certain number of times may be for instance 15-25 times. The control period of the cylinder specific antiknock control system and the time period for said counting could also have duration different from the above-mentioned values.

In one embodiment of the method according to the invention a balancing vector is used in the compensation including cylinder specific fuel supply coefficients and the aim is to keep the vector sum at zero or close to zero, whereby the effect of the decrease of one coefficient is compensated by increasing another or a plurality of other coefficients.

If the engine, to which the method according to the invention is applied, is equipped with cylinder specific measuring of exhaust gas temperature, the method may comprise a further step, in which the quantity of fuel supplied to a cylinder is increased in response to a fall of temperature down to a certain level or below that, while measuring the exhaust gas temperature. When the temperature of the exhaust gas is for instance 60 degrees below the average, the quantity of fuel is increased by 1% or to another suitable degree.

The described method applies to an engine, which uses primarily gas as a fuel. In an engine, where besides a gas a light fuel oil may be used as a fuel, the gas flowing to the cylinder is replaced by fuel oil, if the cylinder knocks heavily.

The balancing unit 34 according to the invention is adapted to take the measures of each embodiment of the method according to the invention, which measures are described in the foregoing and in the claims. The balancing unit is connectable to the cylinder specific antiknock control system. In addition, some applications of the balancing unit may also be connected to other control systems of the engine. It is to be noted that the control system of the engine may be a centralised or a decentralised system. The antiknock control system may for instance be an element separate from the rest of the control system or an integral part of the entire control system. Also, the balancing unit may be either a separate unit or integrated with the remaining control system of the engine. The balancing unit may be realised so that it is a physical entity of its own, such as a circuit board, or it may be realised by a program, whereby it is an entity stored in the memory of the engine's control system. The program may also be stored in a separate data entry device, which is connectable to the control system of the engine, and thus also to the antiknock control system. The program performs the tasks according to the invention, when it is being run in the control system of the engine.

By the method and device according to the invention the output of the engine is thus adaptively equalised among the cylinders so that continuously knocking cylinders are taken into account. Consequently, the entire engine works at a higher operating efficiency than it has been possible by means of the prior art solutions. Thus, also the lifetime of the engine is prolonged and the number of maintenance measures can be cut down.

In the light of the above examples it is apparent that the application according to the invention may be realised by utilising various technical solutions. It is obvious that the invention is not limited to the examples mentioned in this text only, but it can be realised by a plurality of various embodiments within the scope of the inventive idea.

The invention claimed is:

1. A device for balancing the load in an internal combustion engine among the cylinders of the engine, which engine is provided with a cylinder specific antiknock control system, wherein the device comprises a balancing unit connectable to the cylinder specific antiknock control system, which device is adapted to execute a method comprising the steps of
monitoring each cylinder to find out whether the cylinder knocks continuously by utilising cylinder specific measuring data provided by the antiknock control system,
reducing the quantity of fuel supplied to a knocking cylinder permanently if the knock is continuous,
compensating the change in the total output of the engine caused by said reduction of fuel supply by increasing the fuel supply to all cylinders of the engine,
storing the new cylinder specific fuel supply values, and
setting the new cylinder specific fuel supply values as cylinder specific set values of engine.

2. A device according to claim 1, wherein in the cylinder specific monitoring performed by the device it is counted how many times within a predetermined time period the cylinder specific antiknock control system needs to initiate an adjustment that endures at least one control period in order to reduce the quantity of fuel supplied to a knocking cylinder.

3. A device according to claim 2, wherein the time period, during which the times are counted, is 20-40 minutes.

4. A device according to claim 3, wherein the certain number of times reached in the counting is 15-25 times.

5. A device according to claim 2, wherein the device defines a cylinder as continuously knocking, when a certain number of times is reached in the counting.

6. A device according to claim 1, wherein in the compensation a balancing vector is used including cylinder specific fuel supply coefficients and the aim is to keep the vector sum at the balancing value or close co the balancing value, whereby the effect of the decrease of one coefficient is compensated by increasing the coefficients for the all cylinders.

7. A device according to claim 1, wherein the fuel is a gas.

8. A device according to claim 7, wherein in the engine, where besides a gas a fuel oil may be used as a fuel, the gas used by the engine is replaced by fuel oil, when the cylinder knocks heavily.

9. A computer program product containing a computer program that is adapted to execute a method comprising the steps of: monitoring each cylinder to find out whether the cylinder knocks continuously by utilising cylinder specific measuring data provided by the antiknock control system, reducing the quantity of fuel supplied to a knocking cylinder permanently if the knock is continuous, compensating the change in the total output of the engine caused by said reduction of fuel supply by increasing the fuel supply to all cylinders of the engine, storing the new cylinder specific fuel supply values, and setting the new cylinder specific fuel supply values as cylinder specific set values of engine, when the computer program is being run.

10. A method for balancing the load of an internal combustion engine among the cylinders of the engine, which engine is provided with a cylinder specific antiknock control system, wherein the method comprises the steps of
monitoring each cylinder to find out whether the cylinder knocks continuously by utilising cylinder specific measuring data provided by the antiknock control system,
reducing the quantity of fuel supplied to a knocking cylinder permanently if the knock is continuous,
compensating the change in the total output of the engine caused by said reduction of fuel supply by increasing the fuel supply to all cylinders of the engine,
storing the new cylinder specific fuel supply values, and
setting the new cylinder specific fuel supply values as cylinder specific set values of engine.

11. A method according to claim 10, wherein in the cylinder specific monitoring it is counted how many times within a predetermined time period the cylinder specific antiknock control system needs to initiate an adjustment that endures at least one control period in order to reduce the quantity of fuel supplied to the knocking cylinder.

12. A method according to claim 11, wherein the time period, during which the times are counted, is 20-40 minutes.

13. A method according to claim 12, wherein the certain number of times reached in the counting is 15-25 times.

14. A method according to claim 11, wherein a cylinder is defined as continuously knocking, when a certain number of times is reached in the counting.

15. A method according to claim 10, wherein in the compensation a balancing vector including cylinder specific fuel supply coefficients is used, the aim being to keep the vector sum at the balancing value or close to the balancing value, whereby the effect of the decrease of one coefficient is compensated by increasing the coefficients for the all cylinders.

16. A method according to claim 10, wherein for an engine that is equipped with cylinder specific measuring of exhaust gas temperature, the method may comprise a step, in which the quantity of fuel supplied to the cylinder is increased in response to a fall of temperature down to a certain level or below that, while measuring the exhaust gas temperature.

17. A method according to claim 16, wherein the quantity of the fuel is increased by 1%, when the temperature of the exhaust gas is 60° below the average.

18. A method according to claim 10, wherein in the cylinder specific antiknock control system the quantity of fuel supplied to the cylinder is either reduced by 1% every fifth second or increased by 1% every seventh second, in response to the measuring data.

19. A method according to claim 10, wherein the fuel is a gas.

20. A method according to claim 19, wherein in an engine, where besides a gas a light fuel oil may be used as a fuel, the gas used by the engine is replaced by fuel oil, when the cylinder knocks heavily.

* * * * *